US008123385B2

(12) United States Patent
Ohkawa

(10) Patent No.: US 8,123,385 B2
(45) Date of Patent: Feb. 28, 2012

(54) PLANAR LIGHT SOURCE DEVICE AND DISPLAY DEVICE

(75) Inventor: Shingo Ohkawa, Saitama (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 12/556,620

(22) Filed: Sep. 10, 2009

(65) Prior Publication Data

US 2010/0073911 A1 Mar. 25, 2010

(30) Foreign Application Priority Data

Sep. 19, 2008 (JP) ................ P2008-241333

(51) Int. Cl.
*F21V 15/00* (2006.01)
(52) U.S. Cl. ....... 362/367; 362/616; 362/558; 362/97.1; 362/613
(58) Field of Classification Search ........... 362/615, 362/616, 617, 618, 625, 628, 613, 97.1, 558
See application file for complete search history.

(56) References Cited

U.S. PATENT DOCUMENTS 6,939,027 B2 * 9/2005 Harumoto ............ 362/336

FOREIGN PATENT DOCUMENTS

| JP | 11-109317 | 4/1999 |
| JP | 2005-17324 | 1/2005 |
| JP | 2007-206398 | 8/2007 |

* cited by examiner

*Primary Examiner* — Ali Alavi
(74) *Attorney, Agent, or Firm* — Finnegan, Henderson, Farabow, Garrett & Dunner, L.L.P.

(57) ABSTRACT

A planar light source device of the present invention includes a light guide plate and a plurality of light-emitting diodes. The light guide plate includes a plurality of plate-form light guide members whose side surfaces are formed in a serrated shape. The serrated-shaped side surfaces of adjacent light guide members are connected in a planar direction so as to be engaged with each other. The plurality of light-emitting diodes emit light toward each of the light guide members. With this configuration, it is possible to securely prevent irregularity of brightness, when changing the luminance in the display screen in unit of blocks.

6 Claims, 14 Drawing Sheets

360

360

PLANAR LIGHT SOURCE DEVICE AND DISPLAY DEVICE

BACKGROUND OF THE INVENTION

1. Field of the Invention

The present invention relates to a planar light source device and a display device.

2. Description of the Related Art

In the past, there is a known planar light source device, as shown in JP-A No. 2007-206398. This planar light source device has an object of lightning the effect of a luminance decrease in accordance with the boundary of light guide blocks on a light diffusion plate of a display device.

As disclosed in JP-A No. 2005-17324 and JP-A No. 1999-109317, according to a known technique, a display screen is divided into a plurality of blocks, the backlight luminance is changed in the unit of divided blocks in accordance with an input image signal. JP-A No. 2005-17324 and JP-A No. 1999-109317 suggest for low consumption power and for expanding the dynamic range of a display luminance, by changing the backlight luminance in accordance with an input image signal.

SUMMARY OF THE INVENTION

However, JP-A No. 2007-206398 includes light guide blocks arranged in a tile-like form, but does not suggest changing the luminance in the unit of block(s) in accordance with an input image signal, unlike JP-A No. 2005-17324 and JP-A No. 1999-109317. Thus, when changing the luminance in the unit of blocks using a method for controlling only some light guide block(s) to emit light, a radical change occurs in the luminance at the boundary between the light-emitting light guide block and the light guide block without light emission. This results in an issue of brightness irregularity in the luminance.

Thus, in the technique disclosed in JP-A No. 2007-206398, when the backlight luminance is changed in the unit of blocks, the brightness irregularity occurs in the luminance. Therefore, it is difficult to provide a high quality image with a smooth change in contrast of the brightness in the entire display screen.

The present invention has been made in view of the above issue and it is desirable to provide a new and improved planar light source device and display device that can securely restrain the brightness irregularity, when changing the luminance in the display screen in the unit of a plurality of blocks.

According to an embodiment of the present invention, there is provided a planar light source device including: a light guide plate which includes a plurality of plate-form light guide members, whose sides surface are formed in a serrated shape and whose side surfaces in the serrated shape of adjacent light guide members are connected in a planar direction so as to be engaged with each other; and a plurality of light-emitting elements which emit light to each of the light guide members.

According to the above-described configuration, the light guide plate includes a plurality of plate-form light guide members whose side surfaces are formed in a serrated shape. The serrated-shaped side surfaces of adjacent light guide members are connected in a planar direction so as to be engaged with each other. The plurality of light-emitting elements emit light toward each of the light guide members. As the light emitted from the light-emitting elements moves into the planar direction of the light guide member, it enters the serrated-shape side surfaces at a large incidence angle. As a result, it is possible to minimize retroreflective components returning into the light guide members. Thus, light can securely be diffused to the adjacent light guide members, and it is possible to restrain occurrence of irregularity in brightness, when different amounts of light emission are set for each block in the light guide plate.

Further, the serrated-shaped side surface of each of the plurality of light guide members may include a plurality of projections with a head end at an acute angle, and a vertical angle of the projections may be 90° or less.

Further, the light-emitting elements may be controlled such that different amounts of light emission are set for a plurality of blocks in the light guide plate.

According to another embodiment of the present invention, there is provided a display device including: a display panel which displays an image; and a planar light source device, which is arranged so as to face the display panel and includes a light guide plate which includes a plurality of plate-form light guide members whose side surfaces are formed in a serrated shape, and in which serrated-shaped side surfaces of adjacent light guide members are connected in a planar direction so as to be engaged with each other, and a plurality of light-emitting elements which emit light to each of the light guide members.

According to the above-described configuration, the light guide plate is arranged to face a display panel displaying an image. The light guide plate includes a plurality of plate-form light guide members whose side surfaces are formed in a serrated shape, and the serrated-shape sides of adjacent light guide members are connected in a planar direction so as to be engaged with each other. The plurality of light-emitting elements emit light toward each of the light guide members. As a result, as the light emitted from the light-emitting elements moves in a planar direction of the light guide member, it enters the serrated-shaped side surface at a large incidence angle, thus minimizing retroreflective components returning into the light guide members. Therefore, the light can securely be diffused to the adjacent light guide members, and it is possible to prevent occurrence of brightness irregularity, when different amounts of light emission are set for each block in the light guide plate.

Further, the serrated-shaped side surface of the light guide members may include a plurality of projections with a head end at an acute angle, and a vertical angle of the projections may be 90° or less.

Further, an amount of light emission of the light-emitting elements may be controlled for a plurality of blocks in the light guide plate in accordance with an image displayed on the display panel.

According to the present invention, it is possible to provide a planar light source device and display device that can securely restrain the brightness irregularity, when changing the luminance of a display screen in the unit of a plurality of blocks.

DETAILED DESCRIPTION OF THE PREFERRED EMBODIMENTS

Figure 1:
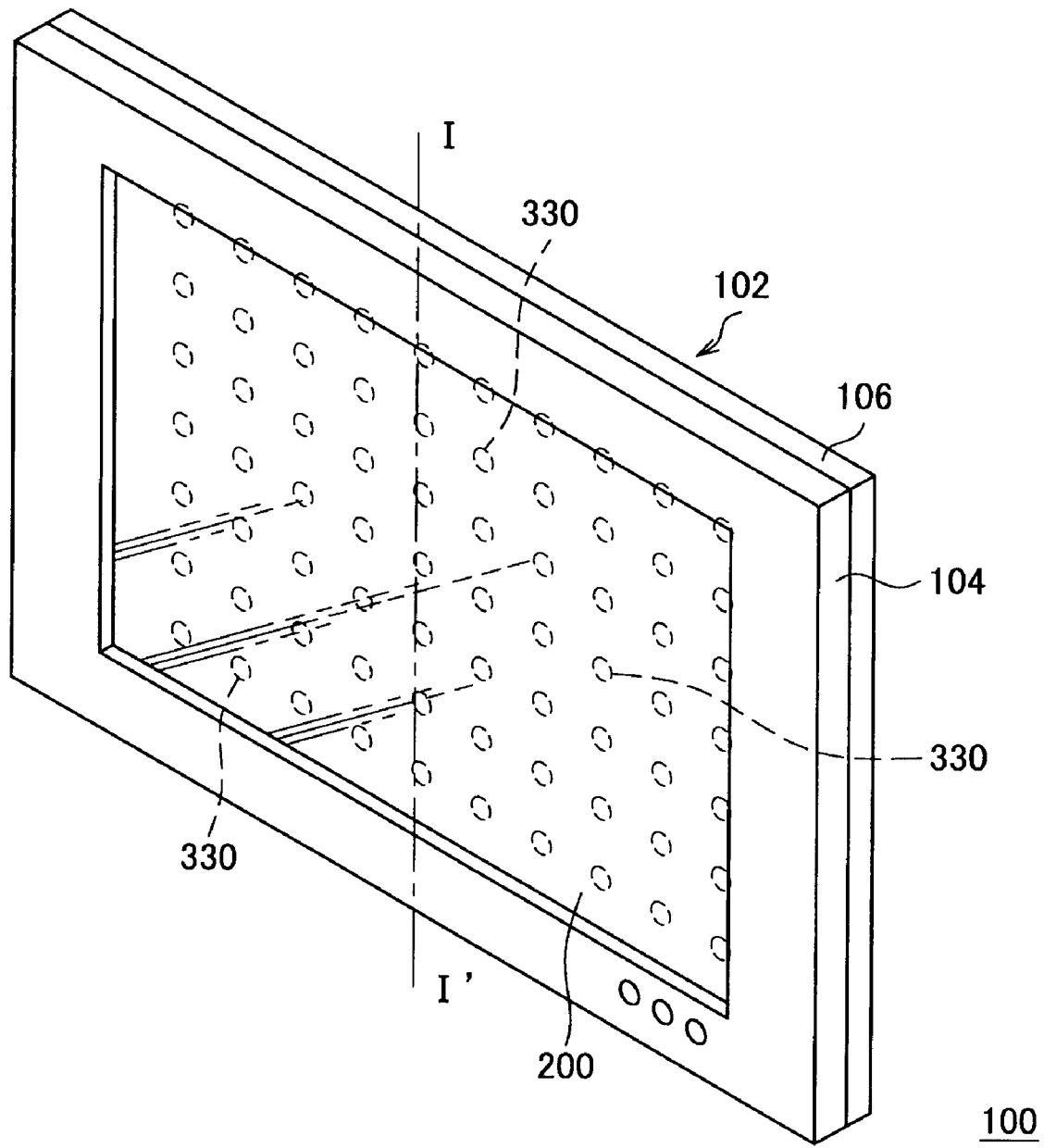
FIG. 1 is a perspective diagram showing a configuration of a display device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The descriptions will be made in the following order.

1. Configuration of a display device according to an embodiment of the present invention
2. Configuration of the surrounding of the light-emitting diode
3. Configuration of a light guide plate
4. Configuration of a light guide member
5. Effect of light diffusion by a light guide member of this embodiment
6. About area for forming an emission facilitating surface

[1. Entire Configuration of Display Device According to Embodiment of Present Invention]

Figure 2:
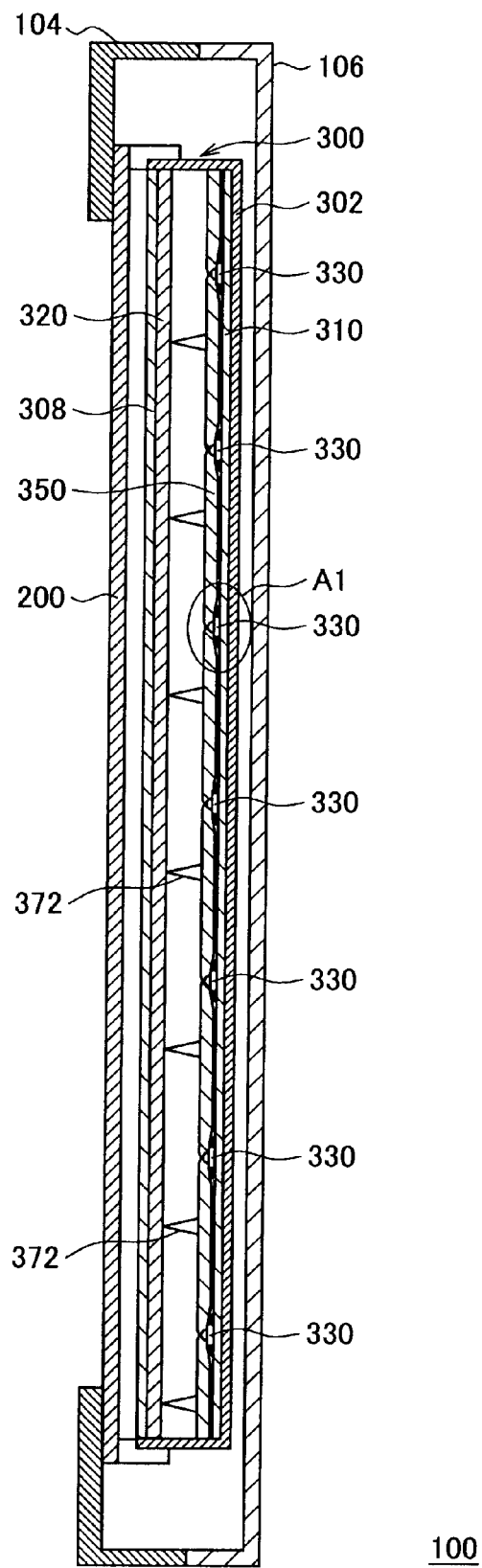
FIG. 2 is a cross sectional view showing a configuration of an image display device, and is a cross sectional view showing a section taken along an alternate long and short dash line I-I' in FIG. 1.

FIG. 1 is a perspective diagram showing a configuration of an image display device 100 according to an embodiment of the present invention. FIG. 2 is a cross sectional view showing the configuration of the image display device 100, and shows a cross section taken along an alternate long and short dash line I-I' in FIG. 1. The image display device 100 includes necessary units inside casing 102. The casing 102 includes a front panel 104 and a rear panel 106 that are coupled back and forth.

The front panel 104 of the casing 102 includes an opening penetrating back and forth, and has a display panel 200 for displaying an image in a position for closing the opening from the inside. The display panel 200 includes a transmission color liquid crystal panel that is put between two polarizing plates forward and backward. The display panel 200 displays full color images by being driven by the active matrix system. The display panel 200 is not limited to a liquid crystal panel. This embodiment is applicable to any display panel 200 that is irradiated from the back surface by a planar light-emitting light source. In the following descriptions, a liquid crystal panel is exemplified as the display panel 200.

The casing 102 includes a planar light source device (backlight) 300 thereinside. The planar light source device 300 includes necessary units for casing 302. The casing 302 is formed in a box-like shape with an opening formed forward, using a metal material or the like having a high thermal conductivity. This box-like shape is flat in a forward and backward directions of the display device 100. The front end of the casing 302 has an optical sheet 308 and a diffusion plate 320 that are attached thereonto.

The optical sheet 308 is configured with a layer of various sheets. The various sheets have a predetermined optical function, and include a prism sheet and a polarization direction changing sheet. The prism sheet refracts light emitted from a light-emitting diode 330 (as will be described later) so as to guide it into a predetermined direction. The polarization direction changing sheet changes the polarization direction.

The optical sheet 308 is attached onto the front surface of the diffusion plate 320, and the diffusion plate 320 faces the light-emitting diode 330. The diffusion plate 320 has a function for attempting to decrease the luminance variation in the display panel 200, by diffusing light emitted from the light-emitting diode 330 inside the casing 302 and irradiating the display panel 200 from its back surface.

A circuit substrate 310 is arranged on the bottom surface of the casing 302. A plurality of light-emitting diodes 330 are arranged in matrix on the circuit substrate 310.

Each of the light-emitting diodes 330 is to emit, for example, white light. However, the light emitting diode does not necessarily emit white light, and may emit red, blue or green light. A plurality of light emitting diodes 330 may be arranged in matrix as one set of light-emitting unit. For example, the one set of light-emitting unit includes the light-emitting diode 330 emitting red light, a light-emitting diode 330 emitting blue light, and two light-emitting diodes 330 emitting green light. Accordingly, the number of light-emitting diodes 330 and the color of light to be emitted are arbitrary.

An acrylic transparent light guide plate 350 which is made of a resin material is arranged on the side of the display panel 200, rather than the side of the light-emitting diodes 330. As will be described later, the light guide plate 350 of this embodiment includes a plurality of light guide members 360.

If the light of the light-emitting diodes 330 is directly irradiated onto the diffusion plate 320, an area of point light sources of the light-emitting diodes 330 appears on the display screen. However, if light is irradiated onto the diffusion plate 320 through the light guide plate 350, the area of point light sources can be securely prevented from appearing on the display screen. If the light of the light-emitting diodes 330 is irradiated onto the diffusion plate 320 through the light guide plate 350, the area of the point light sources can be prevented from occurring on the display screen. The light-emitting diodes 330 and the diffusion plate 320 can be adjacent each other, thus attempting to make the display device 100 thin.

Figure 3:
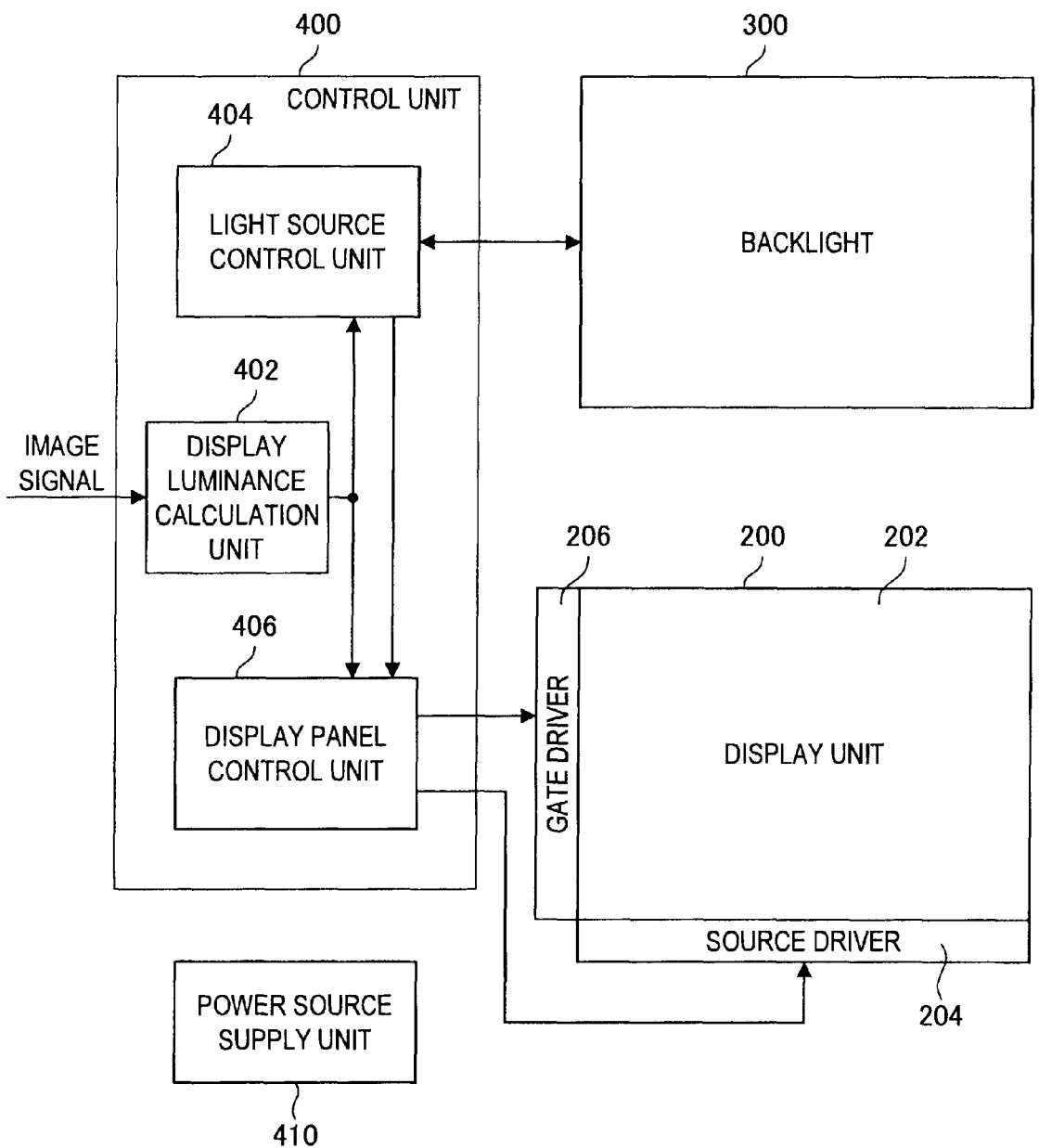
FIG. 3 is a functional block diagram showing a configuration of a display device.

FIG. 3 is a functional block diagram showing a configuration of the display device 100. The display device 100 is configured with a color filter substrate, the display panel 200 having a liquid crystal layer, the planar light source device 300 which is arranged on the rear surface side of the display panel 200, a control unit 400 which controls the display panel 200 and the planar light source device 300, and a power source supply unit 410. The control unit 400 and the power source supply unit 410 may be incorporated together with the display device 100, or may be separated from the display device 100.

The display device 100 displays an original image corresponding to an image signal in a predetermined display area (an area corresponding to a display unit 202 of the display panel 200). The input image signal input to the display device 100 is to correspond to an image with a frame rate of 60 Hz (frame image).

The display panel 200 includes the display unit 202 having openings for transmitting white light from the planar light source device 300. The display panel 200 includes a source driver 204 and a gate driver 206 which are to send a driving signal to a transistor (TFT: Thin Film Transistor (not shown)) provided at each opening of the display unit 202.

The white light transmitted through the opening of the display unit 202 is converted either into red light, green light or blue light, by the color filter formed on the color filter substrate (not illustrated). A set of three openings for emitting red light, green light and blue light correspond to one pixel of the display unit 202.

The planar light source device 300 emits white light in a light emission area corresponding to the display unit 202. The light emission area of the planar light source device 300 is divided into a plurality of blocks (areas), as will be described later, and light emission is controlled individually for each of the divided blocks.

The control unit 400 is configured with a display luminance calculation unit 402, a light source control unit 404, and a display panel control unit 406. To the display luminance calculation unit 402, an image signal corresponding to each frame image is supplied. The display luminance calculation unit 402 obtains a luminance distribution of the frame image from the supplied image signal, and calculates a necessary display luminance for each block, based on the luminance distribution of the frame image. The calculated display luminance is supplied to the light source control unit 404 and the display panel control unit 406.

The light source control unit 404 calculates the backlight luminance in each block of the planar light source device 300 based on the display luminance of each block that is supplied from the display luminance calculation unit 402. The light source control unit 404 controls an amount of light emission of the light-emitting diodes 330 of each block so as to attain the calculated backlight luminance in accordance with PWM (Pulse Width Modulation) control method. Accordingly, the light emission luminance of the planar light source device 300 can be controlled for each block in accordance with the input image signal. Thus, optimum light emission can be realized in accordance with the image displayed on the display panel 200. In the following descriptions, the light emission luminance of the planar light source device 300 is controlled for each block in accordance with the input image signal. This control is referred to as "divided light emission driving".

The light source control unit 404 performs also light emission control for compensating for the light emission luminance or chromaticity based on the light emission luminance or chromaticity of each block that is detected by a sensor arranged in the backlight 300. This sensor is an illuminance sensor or a color sensor, etc.

The backlight luminance of each block of the planar light source device 300 which is calculated by the light source control unit 404 is sent to the display panel control unit 406. The display panel control unit 406 calculates a liquid crystal aperture ratio of each pixel of the display unit 202 based on the display luminance of each block that is sent from the display luminance calculation unit 402 and the backlight luminance of each block that is sent from the light source control unit 404. The display panel control unit 406 sends a driving signal to the source driver 204 and the gate driver 206 of the display panel 200 so as to obtain the calculated liquid crystal aperture ratio, and then performs drive-control of the TFT of each pixel in the display panel 200. The power source supply unit 410 supplies each unit of the display device 100 with a predetermined power source.

[2. Configuration of Surrounding of Light-Emitting Diode]

Figure 4:
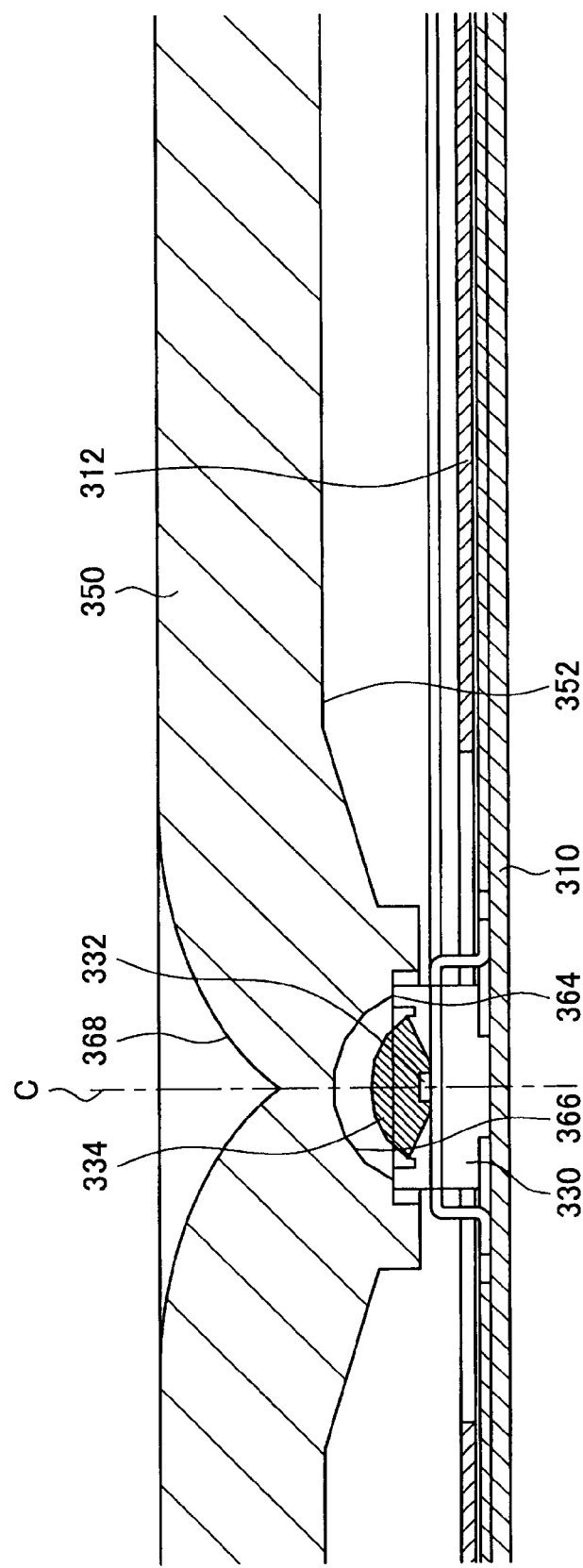
FIG. 4 is a cross sectional view showing enlargement of a light-emitting diode and its surrounding in an area A1 in FIG. 2.

FIG. 4 is a cross sectional view showing enlargement of the light-emitting diode 330 and its surrounding in an area A1 in FIG. 2. The light-emitting diode 330 is mounted on the circuit substrate 310, and its planer shape is nearly square. The light-emitting diode 330 includes a light-emitting unit 332 and a sealing resin 334. Light emitted by the light-emitting diode 330 is emitted from the light-emitting unit 332. The light-emitting unit 332 is covered with the transparent sealing resin 334 including a fluorescent substance.

The area of the light guide plate 350 that faces the light-emitting diode 330 projects toward the light-emitting diode 330, rather than toward a back surface 352 of the light guide plate 350. The area includes a contact surface 364 with the light-emitting diode 330 and a hemispherical concave part 366. The contact surface 364 has an outline of a round planar shape, and is formed in a wider range than that of the planar shape of the square light-emitting diode 330. The concave part 366 is formed in a narrower range than that of the outline of the contact surface 364.

The upper surface of the light-emitting diode 330 is in contact with the contact surface 364 on the four corners, and thus defining a space between the light-emitting diode 330 and the light guide plate 350. Due to the configuration wherein the concave part 366 is formed inside the contact surface 364, the sealing resin 334 and the light guide plate 350 are not in contact with each other in the state where the upper surface of the light-emitting diode 330 is in contact with the contact surface 364.

A concave surface 368 is formed on the surface of the light guide plate that is opposite to the surface of the concave part 366. As will be described later, the concave surface 368 has a function to refract light emitted from the light-emitting diode 330 into the planar direction of the light guide plate 350. The contact surface 364, the concave part 366 and the concave surface 368 are in rotational symmetry form about a central axis C in FIG. 4.

A reflection sheet 312 is formed on the circuit substrate 310. The reflection sheet 312 is thus formed, thereby reflecting light leaked from a back surface 352 of the light guide plate 350 toward the circuit substrate 310 onto the light guide plate 350. An emission facilitating surface is formed on the back surface 352 of the light guide plate 350. The emission facilitating surface has a function for diffusing light in the light guide plate 350 and for facilitating emission of light toward the diffusion plate 320. Thus, light emitted from the light-emitting diode 330 can be irradiated onto the side of the display panel 200 with high efficiency. The emission facilitating surface can be configured by forming a fine unevenness shape (scattering dots through pearskin finishing or the like) in the back surface 352. The emission facilitating surface may be formed by printing a reflection film or the like on the back surface 352.

[3. Configuration of Light Guide Plate]

Figure 5:
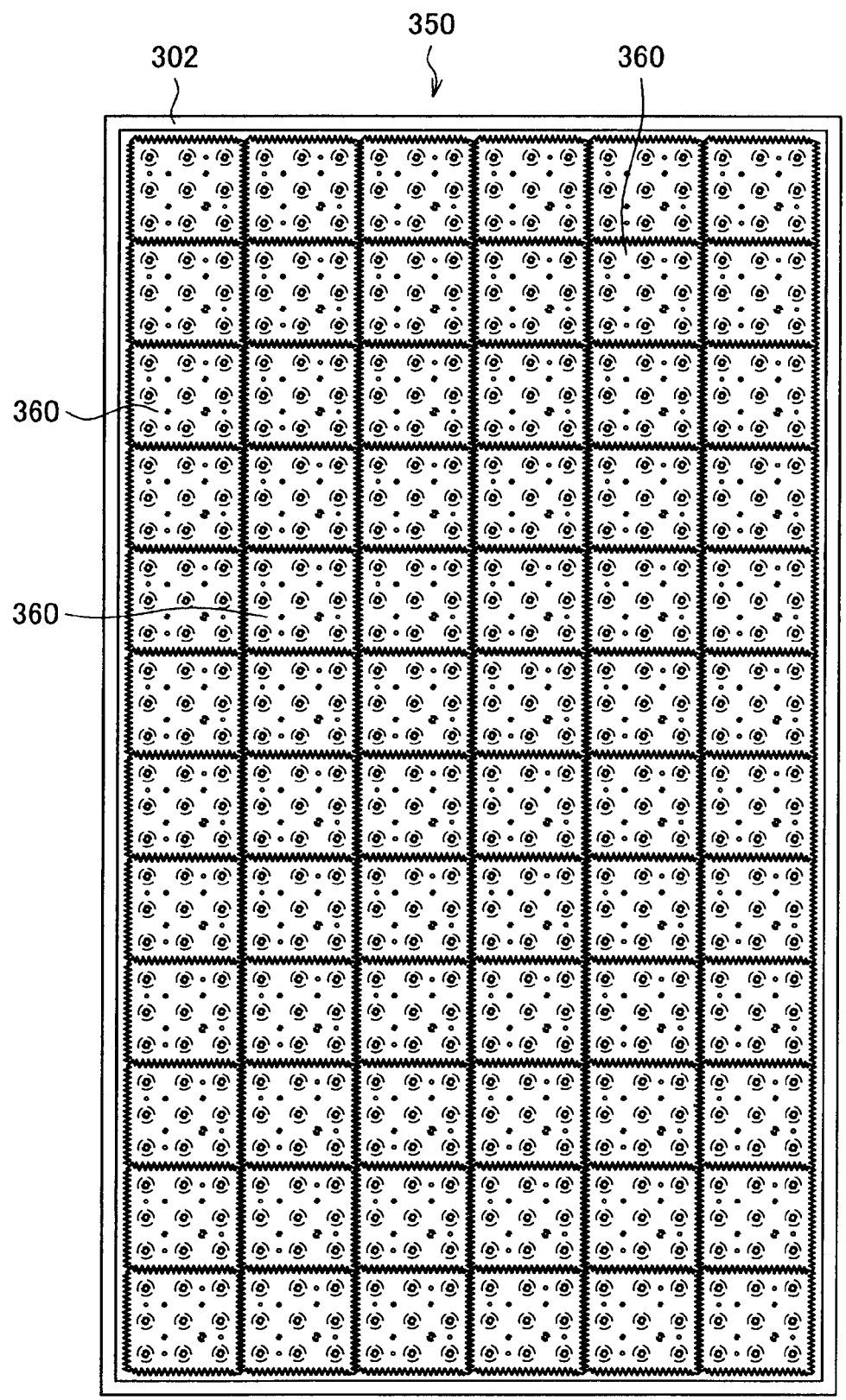
FIG. 5 is a planar view showing a configuration of a light guide plate and casing.

FIG. 5 is a planar view showing a configuration of the light guide plate 350 and the casing 302. As shown in FIG. 5, the light guide plate 350 is configured with a plurality of plate-form light guide members 360. In the example of FIG. 5, seventy-two light guide members 360 are arranged so as to configure one light guide plate 350 corresponding to 46 inch-sized display. The light guide plate 350 is arranged inside the box-type casing 302.

When the light guide plate 350 is formed in one piece with a resin material, such as acryl, etc., the light-emitting diode 330 and the light guide plate 350 relatively deviate from each other by the effect of a temperature change, due to a thermal expansion coefficient difference between the light guide plate 350 and the circuit substrate 310. This results in a difficulty in even light emission. According to this embodiment, the light guide plate 350 is configured with the plurality of light guide members 360, thereby restraining the relative positional deviation of the light-emitting diode 330 and the light guide plate 350 (especially the concave surface 368 as will be described later). In addition, it is possible to diffuse light evenly inside the light guide plate 350. Further, the light guide plate 350 is configured with the plurality of light guide members 360, so that even a large-sized light guide plate 350 can easily be manufactured, thus minimizing the manufacturing cost.

Figure 6:
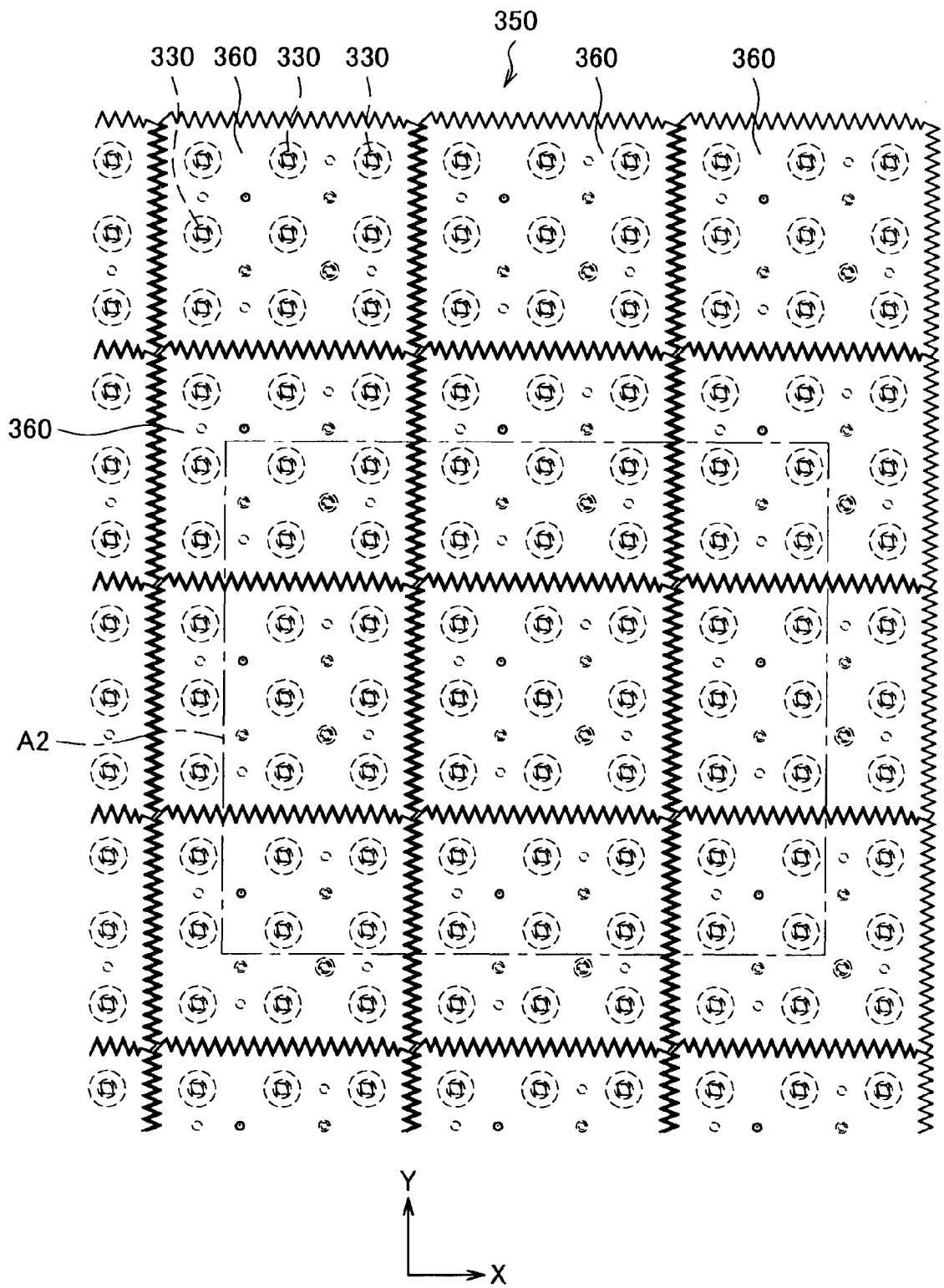
FIG. 6 is a planar view showing enlargement of a part of an area in FIG. 5.

FIG. 6 is a planar view showing enlargement of a part of FIG. 5. As shown in FIG. 6, the side end surface of each light guide member 360 has a serrated shape, and has a complementary form so as to be engaged with each other in the serrated shape of the side end surface of the adjacent light guide members 360. This minimizes the gape between the adjacent light guide members 360.

One light guide member 360 is mounted for nine light-emitting diodes 330 on the circuit substrate 310. The contact surface 364, the concave part 366 and the concave surface 368 are formed for each of the nine light-emitting diodes 330.

[4. Configuration of Light Guide Member]

Figure 7:
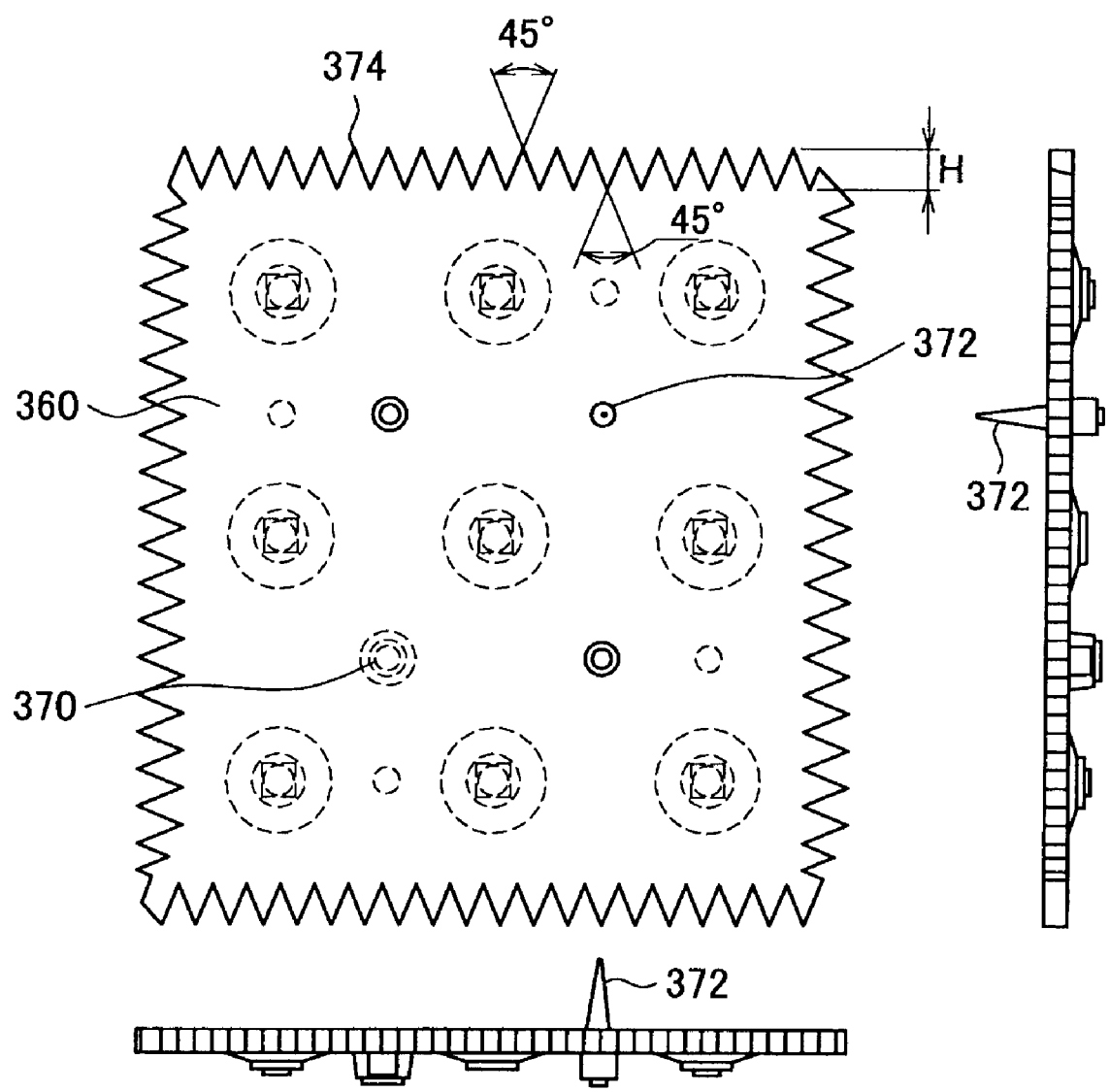
FIG. 7 is a schematic diagram showing one light guide member, and is a schematic diagram showing a planar shape of the light guide member and its side shape.

FIG. 7 is a schematic diagram showing one light guide member 360, and shows a planar shape of the light guide member 360 and its side shape. As shown in FIG. 7, projections 374 forming the serrated shape are formed on each side of the light guide member 360. The head end of each of the projections 374 has an angle of approximately 45°. The angle between adjacent projections 374 is approximately 45°. The height of the projection 374 is set to a predetermined value H. According to this configuration, the projections 374 of the adjacent light guide members 360 are engaged with each other so as to be adjacent as shown in FIG. 6.

Each light guide member 360 includes a screw hole 370 through which a screw for fixing the light guide member 360 onto the circuit substrate 310 (casing 302) inserted. The light guide member 360 includes also projections 372 whose head ends are in contact with the diffusion plate 320 so as to define the space with respect to the diffusion plate 320.

Figure 8:
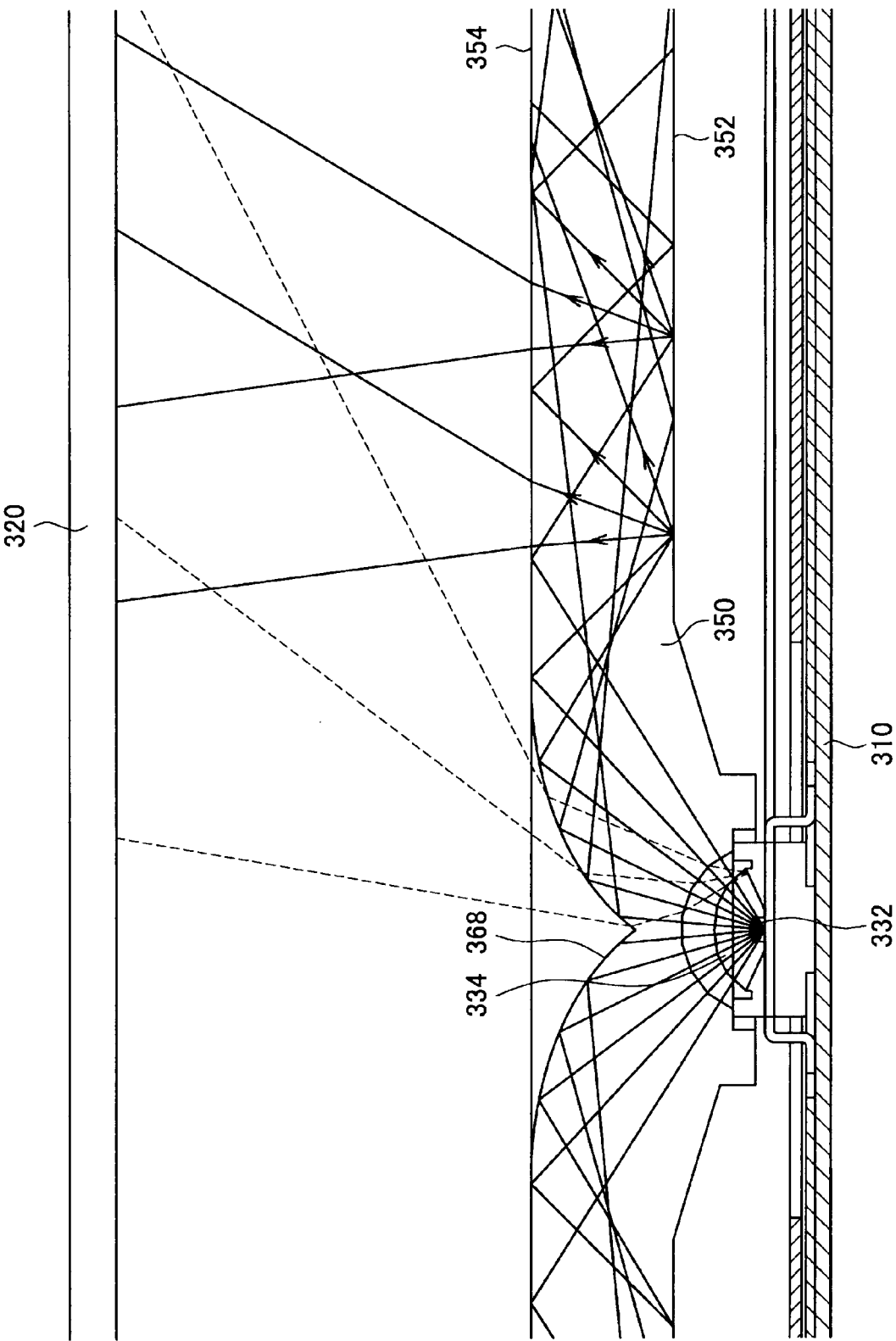
FIG. 8 is a cross sectional view showing a state where light emitted from a light-emitting unit of the light-emitting diode reflects in the light guide plate.

FIG. 8 is a cross sectional view showing the state where light emitted from the light-emitting unit 332 of the light-emitting diode 330 is reflected in the light guide plate 350. As shown in FIG. 8, light emitted from the light emitting unit 332 is emitted in a radial manner from the sealing resin 334, and enters the light guide plate 350. The light emitted from the light-emitting unit 332 is reflected on a curved surface 368 of the light guide plate 350 along the route of the solid lines in FIG. 8. Further, while the light is reflected on a surface 354 and the back surface 352 of the light guide plate 350, it goes along the planar direction of the light guide plate 350. Thus, the entire surface of the light guide plate 350 emits light using the light emitted from the light-emitting unit 332. Then, the diffusion plate 320 is irradiated from the back surface. The light, which has been emitted from the light-emitting unit 332 and entered the light guide plate 350 from the surrounding of the sealing resin 334, is refracted on the curved surface 368 along the route of the broken lines in FIG. 8, so as to irradiate the back surface of the diffusion plate 320. As a result, it is possible to prevent the lack of a sufficient amount of light emission of the light guide plate 350 in a position corresponding to the curved surface 368 on the light-emitting diode 330.

Figure 9:
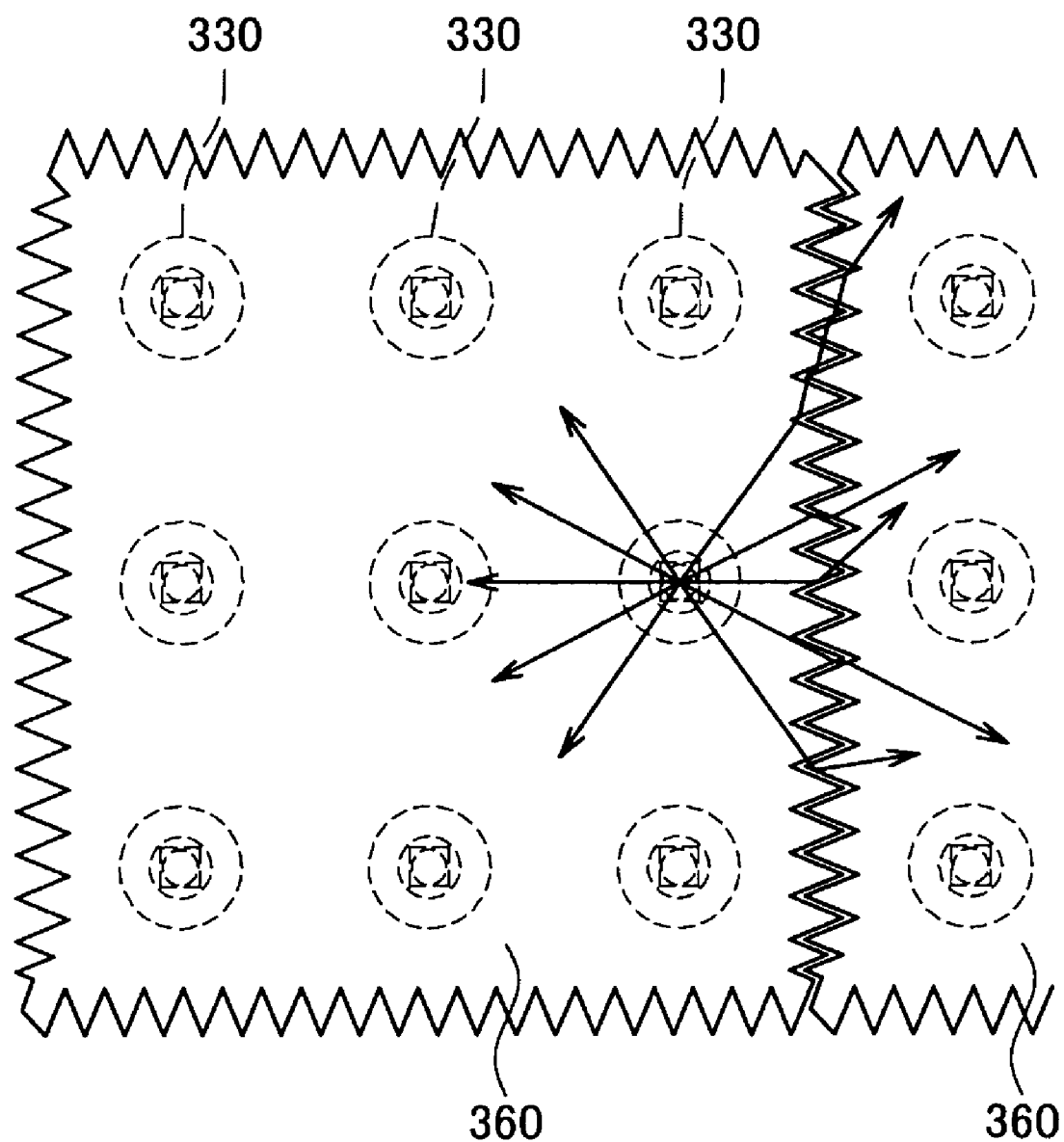
FIG. 9 is a planar view showing a state where light, emitted from the light-emitting diode and reflected on a concave surface so as to be diffused in a planar direction, is propagated from a serrated-shaped side end surface through adjacent light guide members.

FIG. 9 is a planar view showing a state where light, emitted from the light-emitting diode 330 and reflected on the concave surface 368 so as to be diffused in a planar direction, is propagated from a side end surface having a serrated shape through the adjacent light guide member 360. As shown in FIG. 9, the side end surface of the light guide member 360 has a serrated shape. Due to this configuration, the light diffused along the side end surface enters at a large (shallow) angle of incidence with respect to the surface of the projection 374. As a result, it is possible to prevent that the light reflected on the concave surface 368 and diffused in the planar direction is reflected in a direction returning into the light guide member 360. Therefore, the light emitted from the light-emitting diode 330 can be diffused to the adjacent light guide members 360, thus securely preventing that the light stays inside the light guide member 360.

As a result, it is possible to prevent any outstanding amount of light in an area around its surroundings, when "divided light emission driving" is performed while setting different amounts of light emission of the planar light source device 300 between the blocks. Therefore, it is possible to prevent occurrence of a boundary between an area with a large amount of light and an area with a small amount of light, due to a sudden change in the amount of light.

For example, when only a particular light guide member 360 emits light by performing the divided light emission driving using one block of the light emission area of the planar light source device 300 as one light guide member 360, light is sufficiently diffused from the particular light-emitting light guide member 360 to an adjacent light guide member(s) 360. Thus, it is possible to prevent that only the particular light guide member 360 emits light, and it is also possible to prevent occurrence of a contrast boundary due to different amounts of lights between the surrounding light guide member(s) 360.

According to this embodiment, when the divided light emission driving is performed, it is possible to sufficiently diffuse light from the light-emitting light guide member 360 to the surrounding light guide member 360. Thus, light emission is possible relatively in a wide range around the light-emitting light guide member 360. Further, it is possible to gently decrease an amount of light in accordance with the distance from the light emission area. When the divided light emission driving is performed, it is possible to prevent that the luminance near the light-emitting light guide member 360 is remarkably higher than its surrounding areas, and it is also possible to prevent an outstanding boundary resulting from a luminance difference with respect to the adjacent light guide member 360. As a result, when the divided light emission driving is performed, it is possible to gently change the value of the amount of light emission for each block. In addition, it is possible to prevent the outstanding contrast between the blocks, resulting from different amounts of light emission between the blocks. Therefore, it is possible to naturally emit light on the entire surface of the display panel 200, when the divided light emission driving is performed.

It is preferred that the angle of the head end of the projection 374 is set at 90° or smaller, as well as the angle between the adjacent projections 374. This realizes a large incidence angle of light toward the side surface of the projections 374, and it is possible to minimize the return light to the inside of the light guide member 360. Particularly, as shown in FIG. 7, the angle of the head end of the projections 374 is set at approximately 45°, as well as the angle between the adjacent projections 374. This realizes a large incidence angle of light toward the side surface of the projections 374, and also the projections 374 can easily be formed.

As shown in FIG. 9, clearance (space) is formed between the side end surfaces of the adjacent light guide members 360. Thus, when the light guide member 360 expands and contracts due to a temperature or humidity change, the adjacent light guide members 360 can be prevented from being in contact with each other. In addition, it is possible to prevent the interference, positional deviation and transformation of the light guide members 360. Therefore, when the light guide plate 350 is formed from a plurality of light guide members 360, it is possible to prevent the distortion of the light guide plate 350 or the circuit substrate 310. This distortion results from a difference between the linear expansion coefficient of the light guide plate 350 and the linear expansion coefficient of the circuit substrate 310.

[5. Effect of Light Diffusion by Light Guide Member of this Embodiment]

Figure 10C:
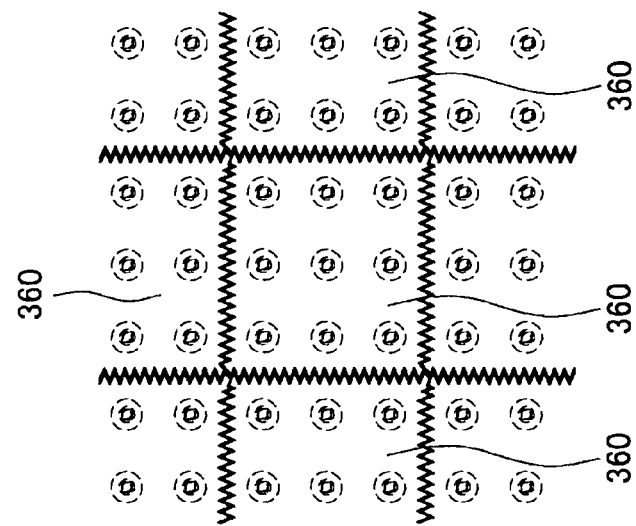
FIG. 10C is a diagram for explaining the effect of light diffusion by the light guide member of this embodiment.
Figure 10B:
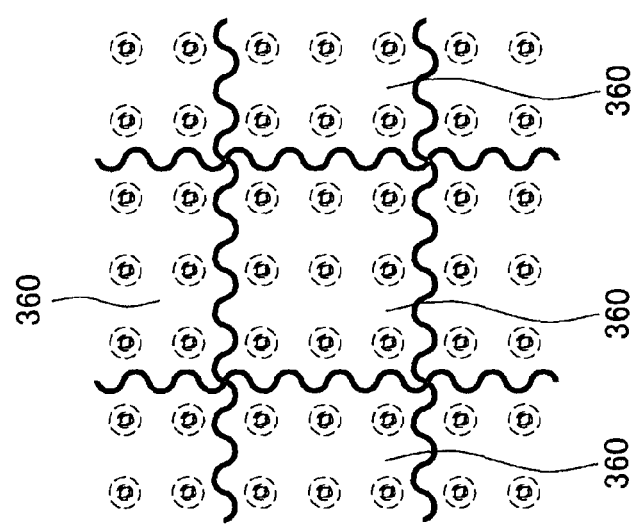
FIG. 10B is a diagram for explaining the effect of light diffusion by the light guide member of this embodiment.
Figure 10A:
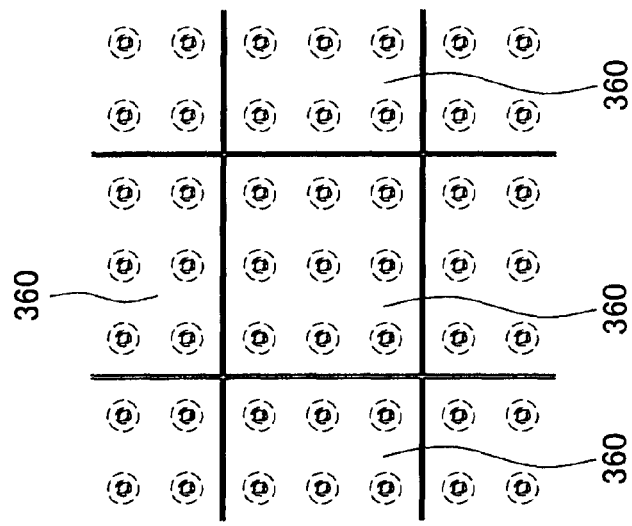
FIG. 10A is a diagram for explaining the effect of light diffusion by the light guide member of this embodiment.
Figure 11C:
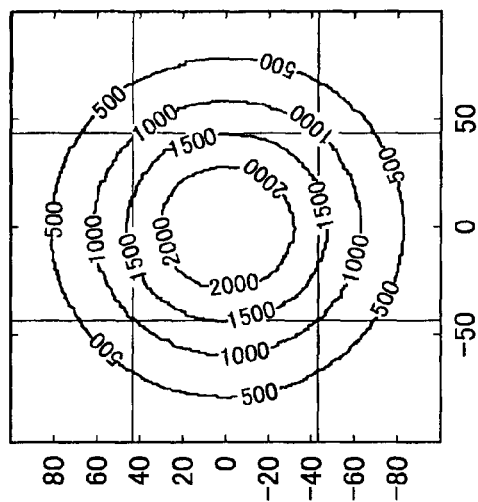
FIG. 11C is a diagram for explaining the effect of light diffusion by the light guide member of this embodiment.
Figure 11B:
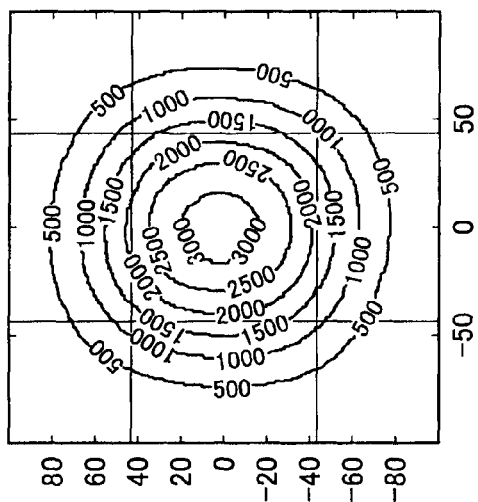
FIG. 11B is a diagram for explaining the effect of light diffusion by the light guide member of this embodiment.
Figure 11A:
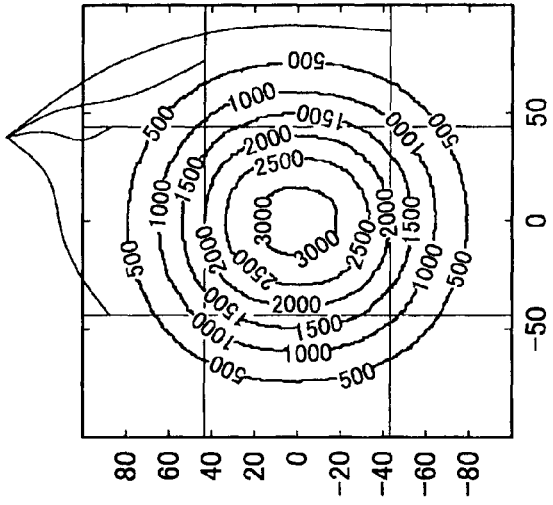
FIG. 11A is a diagram for explaining the effect of light diffusion by the light guide member of this embodiment.
Figure 12:
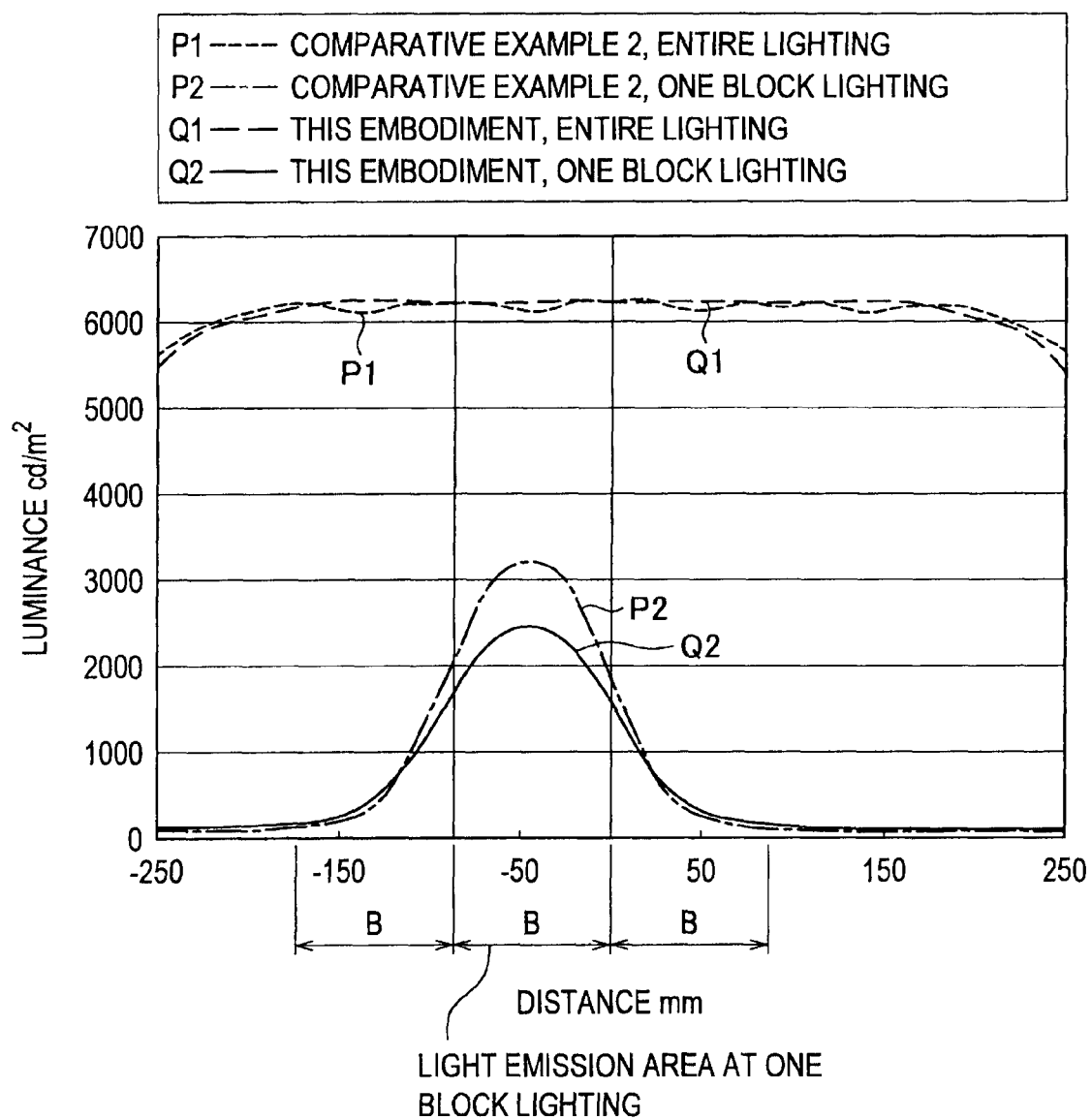
FIG. 12 is a diagram for explaining the effect of light diffusion by the light guide member of this embodiment.

FIG. 10, FIG. 11 and FIG. 12 are diagrams for explaining the effect of light diffusion by the light guide member 360 of this embodiment. FIG. 10 shows the light guide member 360 of this embodiment and also the planar form of the light guide member 360 both in comparative examples 1 and 2, when the light guide plate 350 is formed from a plurality of light guide members 360. FIG. 10A shows the light guide member 360 in the comparative example 1, FIG. 10B shows the light guide member 360 in the comparative example 2, and FIG. 10C shows the light guide member 360 of this embodiment. As shown in FIG. 10A, in the light guide member 360 of the comparative example 1, the side end surface of each light guide member 360 is linearly formed, and planes of the side end surface of the adjacent light guide members 360 face each other. As shown in FIG. 10B, in the light guide member 360 of the comparative example 2, the side end surface of each light guide member 360 has an uneven surface with curves, and the curved surfaces face each other on the side end surface of the adjacent light guide members 360.

FIG. 11A, FIG. 11B and FIG. 11C are characteristic diagrams each showing a luminance distribution in an area corresponding to the area A2 shown in FIG. 6, when only one central light guide member 360 emits light in the area A2, while the rest of light guide members 360 do not emit light. FIG. 11A corresponds to the characteristic of the comparative example 1, FIG. 11B corresponds to the characteristic of the comparative example 2, and FIG. 11C corresponds to the characteristic of this embodiment. In FIG. 11A, FIG. 11B and FIG. 11C, the unit of luminance is $[cd/m^2]$. In FIG. 11A, FIG. 11B and FIG. 11C, the lines dividing nine areas represent the boundaries of the light guide members 360.

As shown in FIG. 11A and FIG. 11B, in the comparative examples 1 and 2, the central luminance reaches 3000 $[cd/m^2]$, and the luminance radically drops as being away from the center to the periphery. Thus, the gradient of luminance becomes large. This characteristic occurs, since light is not circumferentially diffused. In this case, the light is not diffused because the light of the light-emitting light guide member 360 is reflected on the side end surface, returns into the light guide member 360, thereby increasing the central luminance. In the comparative examples 1 and 2, an incidence angle of light toward the side end surface is smaller than that of this embodiment. Thus, an amount of light reflected on the side end surface and returning into the light guide member 360 will be large. As a result, the light is not sufficiently diffused to the adjacent light guide members 360. This results in the boundary between the adjacent light guide members 360, due to a contrast difference, resulting in irregularity of brightness between blocks.

As shown in FIG. 11C, in this embodiment, the central luminance decreases approximately to 2000 $[cd/m^2]$, and gently decreases as being away from the center. In this manner, according to the configuration of this embodiment, the light of the light-emitting light guide member is diffused easily to the surrounding light guide member 360, and the gradient of luminance is gentler than the case of FIG. 11A and FIG. 11B, because the side end surface of the light guide member 360 is formed in a serrated shape. Thus, the luminance can gradually decrease as being away from the light emission area to the periphery, and it is possible to prevent an outstanding boundary resulting from a contrast difference between the light emission area and an area without light emission.

FIG. 12 is a characteristic diagram showing the relationship between the position of the light guide member 360 in a direction "X" (see FIG. 6) and the luminance, in the characteristics of the comparative example 2 of FIG. 11 and this embodiment. In FIG. 12, the horizontal axis shows the position of the light guide member 360 in the direction "X", while the vertical axis shows the luminance. A distance "B" shown on the horizontal axis represents the length of one side of the light guide member 360. A characteristic P1 shows a characteristic of the case where the entire light guide members 360 emit light in the comparative example 2, while a characteristic P2 shows a characteristic of the case where only one light guide member 360 which is in the center of the area corresponding to the area A2 in the comparative example 2 emits light. A characteristic Q1 shows a characteristic wherein the entire light guide members 360 emit light in this embodiment, while a characteristic Q2 shows a characteristic wherein only one light guide member 360 which is in the center of the area corresponding to the area A2 in this embodiment emits light.

As shown in FIG. 12, when the entire light guide members 360 emit light, as compared between the characteristics P1 and Q1, the light is easily diffused to the adjacent light guide members 360 in this embodiment. Therefore, the luminance is evenly obtained as compared with the comparative example 2, in this embodiment.

When only one central light guide member 360 emits light, the luminance gently decreases as being away from the center in the range of the light-emitting light guide member 360 in this embodiment, as compared between the characteristics P2 and Q2. In the comparative example 2, the luminance radically drops from the center of the range. The central luminance of the light-emitting light guide member 360 is higher in the comparative example 2 than that in this embodiment.

Thus, according to this embodiment, the luminance can gently decrease in a range from the center of the light-emitting light guide member 360 toward its periphery. As a result, it is possible to securely prevent occurrence of a boundary between the light-emitting light guide member 360 and its surrounding light guide member(s) 360 due to a contrast difference.

Figure 13:
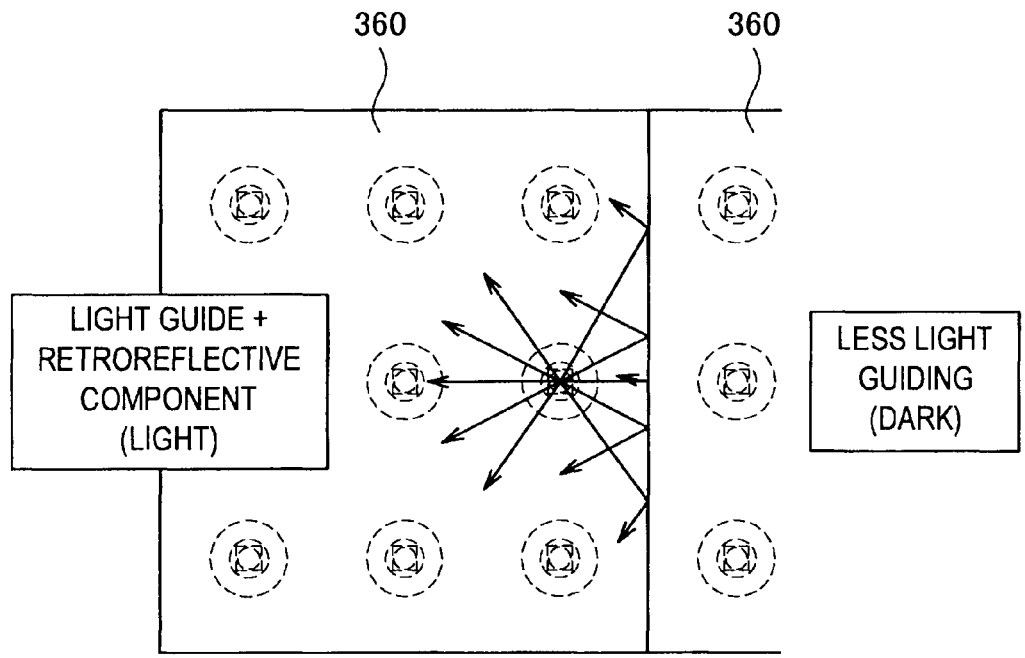
FIG. 13 is a schematic diagram showing a state where light diffused into the planar direction of a light guide member 360 is reflected on a side end surface, in a comparative example 1.
Figure 14:
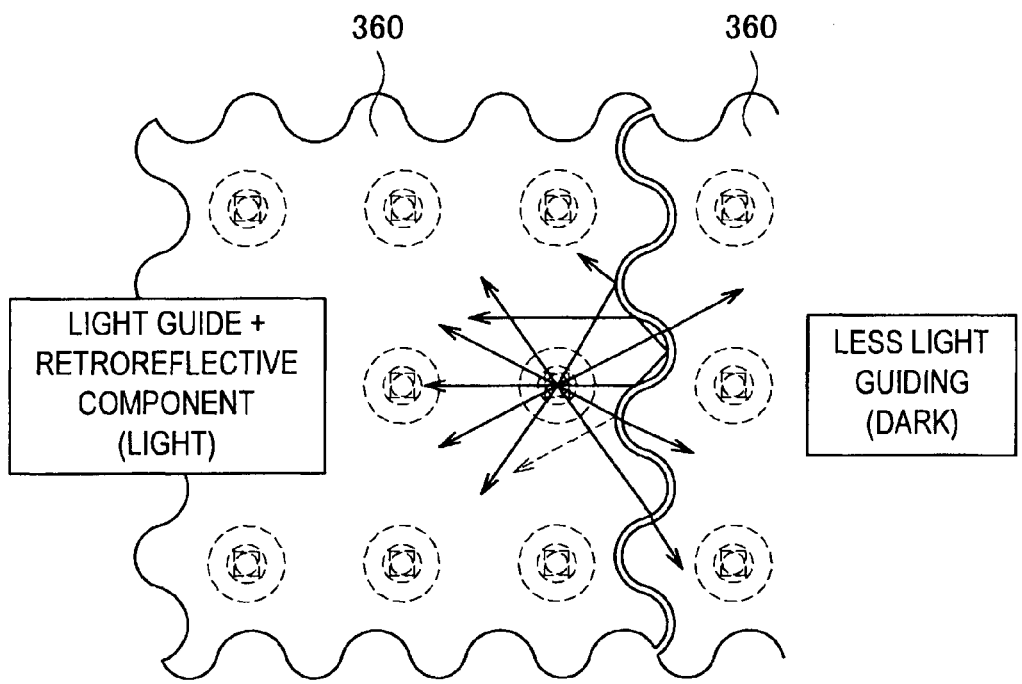
FIG. 14 is a schematic diagram showing a state where light diffused into the planar direction of the light guide member 360 is reflected on a side end surface, in a comparative example 2.

FIG. 13 is a schematic diagram showing the state where light diffused in the planar direction of the light guide member 360 is reflected on the side end surface, in the comparative example 1. FIG. 14 is a schematic diagram showing the state where the light diffused in the planar direction of the light guide member 360 is reflected on the side end surface, in the comparative example 2. As shown in FIG. 13 and FIG. 14, in the comparative examples 1 and 2, an incidence angle of light toward the side end surface is smaller than that in this embodiment. Thus, many retroreflective components return into the light guide member 360, after being reflected on the side end surface, and light is not sufficiently diffused to the adjacent light guide member 360. In this embodiment, as shown in FIG. 9, the light diffused toward the side end surface enters the surface of the projections 374 at a large (shallow) incidence angle. Thus, retroreflective components returning into the light guide member 360 can be minimized. Therefore, the light emitted from the light-emitting diode 330 can be diffused to the adjacent light guide member 360, and the light can securely be prevented from staying inside the light guide member 360.

[6. About Area for Forming an Emission Facilitating Surface]

Figure 15:
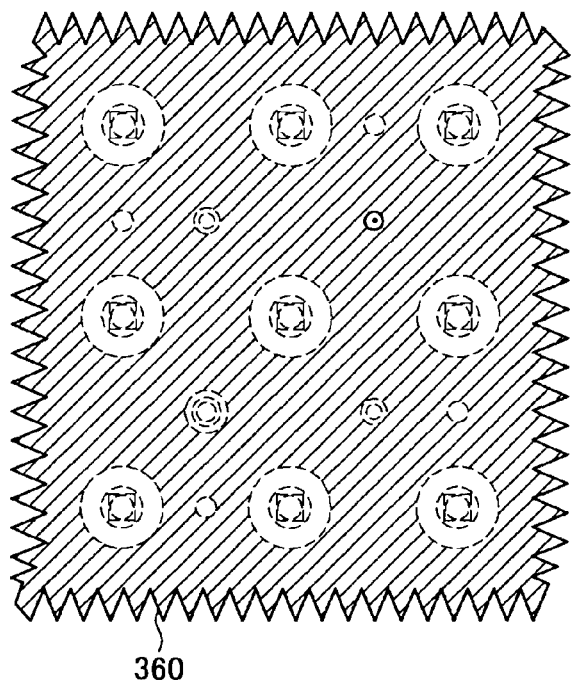
FIG. 15 is a schematic diagram showing a case where an emission facilitating surface is formed entirely on the back surface of the light guide member.
Figure 16:
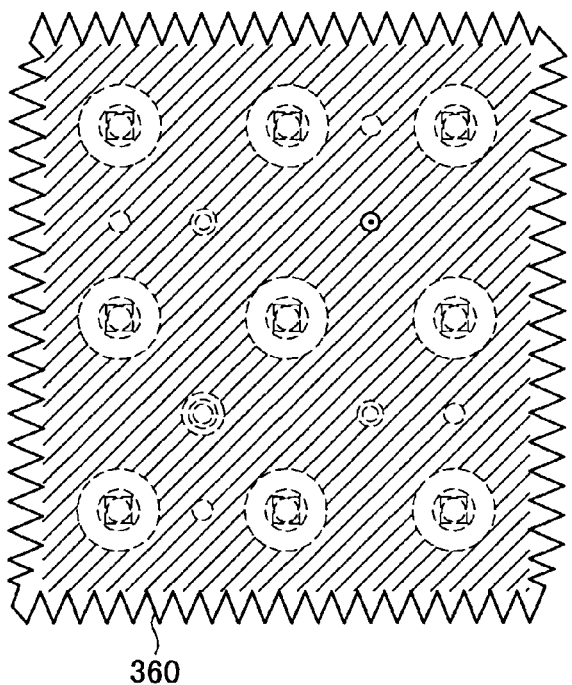
FIG. 16 is a schematic diagram showing a case where an emission facilitating surface is formed on the back surface of the light guide member, in an area excluding projections forming a serrated shape.

As described above, the emission facilitating surface is formed on the back surface of the light guide plate 350. FIG. 15 shows the case where the emission facilitating surface is formed entirely on the back surface of the light guide member 360. FIG. 16 shows the case where the emission facilitating surface is formed entirely on the back surface of the light guide member 360, in an area excluding the projections 374 forming the serrated shape. In FIG. 15 and FIG. 16, the area with hatching is this emission facilitating surface.

Accordingly, the emission facilitating surface may be formed entirely on the back surface of the light guide member 360, or may be formed in an area excluding the projections 374 forming the serrated shape. Clearance is formed between the adjacent light guide members 360, so that light emission to the diffusion plate 320 is facilitated in a clearance part. Thus, as shown in FIG. 16, to restrain light emission in the part of the projections 374, no emission facilitating surface may be formed in the area of the projections 374.

As explained above, according to this embodiment, the side end surface of the light guide member 360 is formed in a serrated shape. With this configuration, the light diffused toward the side end surface enters the surface of the projections 374 at a large incidence angle. This can prevent that the light diffused into the planar direction of the light guide member 360 is reflected on the side end surface so as to return into the light guide member 360. Thus, the light emitted from the light-emitting diode 330 can be diffused to the adjacent light guide member 360, and the light can be prevented from staying inside the light guide member 360. As a result, when the divided light emission driving is performed with a variety of amounts of light emission of the planar light source device 300, it is possible to prevent occurrence of a boundary between an area with a large amount of light and an area with a small amount of light due to a sudden change in the amount of light, and it is also possible to securely prevent irregularity of brightness of luminance.

The present invention contains subject matter related to Japanese Patent Application JP 2008-241333 filed in the Japan Patent Office on Sep. 19, 2008, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A planar light source device comprising:
   a light guide plate comprising a plurality of plate-form light guide members, the light guide members having side surfaces in a serrated shape, the side surfaces in the serrated shape of adjacent light guide members being connected in a planar direction so as to be engaged with each other; and
   a plurality of light-emitting elements which emit light to each of the light guide members.

2. The planar light source device according to claim 1, wherein the serrated-shaped side surfaces of the plurality of light guide members comprise a plurality of projections with a head end at an acute angle, and a vertical angle of the projections is 90° or less.

3. The planar light source device according to claim 1, wherein the light-emitting elements are controlled such that different amounts of light emission are set for a plurality of blocks in the light guide plate.

4. A display device comprising:
   a display panel which displays an image; and
   a planar light source device facing the display panel and comprising:
      a light guide plate comprising a plurality of plate-form light guide members, the plate-form light guide members having side surfaces in a serrated shape, the serrated-shaped side surfaces of adjacent light guide members being connected in a planar direction so as to be engaged with each other, and
      a plurality of light-emitting elements which emit light to each of the light guide members.

5. The display device according to claim 4, wherein the serrated-shaped side surfaces of the light guide members comprise a plurality of projections with a head end at an acute angle, and a vertical angle of the projections is 90° or less.

6. The display device according to claim 4, wherein an amount of light emission of the light-emitting elements is controlled for a plurality of blocks in the light guide plate in accordance with an image displayed on the display panel.

* * * * *